United States Patent [19]
Schmidt

[11] Patent Number: 6,144,419
[45] Date of Patent: Nov. 7, 2000

[54] COLLAPSIBLE GLARE REDUCTION DEVICE FOR A VIDEO MONITOR

[75] Inventor: Robert P. Schmidt, Hermosa Beach, Calif.

[73] Assignee: Hoodman Corporation, Redondo Beach, Calif.

[21] Appl. No.: 09/368,889

[22] Filed: Aug. 5, 1999

[51] Int. Cl.⁷ .............................. H04N 5/64; G02B 27/00
[52] U.S. Cl. ........................... 348/842; 359/601; 359/609
[58] Field of Search .................................... 348/834, 842; 312/7.2; 359/601, 609, 612; 248/918, 205.2

[56] References Cited

U.S. PATENT DOCUMENTS

| | | | |
|---|---|---|---|
| 3,329,770 | 7/1967 | Rose | 348/842 X |
| 3,781,471 | 12/1973 | Hoffberger, II et al. | 348/842 |
| 4,314,280 | 2/1982 | Rose | 348/842 |
| 4,865,420 | 9/1989 | Schmidt | 348/834 X |
| 5,115,345 | 5/1992 | Hobson et al. | 359/601 |
| 5,121,253 | 6/1992 | Waintroob | 359/601 |
| 5,218,474 | 6/1993 | Kirschner | 359/609 X |
| 5,233,468 | 8/1993 | McNulty | 359/601 |
| 5,325,970 | 7/1994 | Dillon et al. | 312/208.3 X |
| 5,818,635 | 10/1998 | Hohn et al. | 359/612 |
| 5,905,546 | 5/1999 | Giulie et al. | 348/842 |
| 5,966,241 | 10/1999 | Gilger | 359/609 |
| 5,988,823 | 11/1999 | Wong | 348/842 X |
| 5,997,145 | 12/1999 | Mora | 348/842 X |

*Primary Examiner*—Peter M. Cuomo
*Assistant Examiner*—James O. Hansen
*Attorney, Agent, or Firm*—Fildes & Outland, P.C.

[57] ABSTRACT

A collapsible glare reduction device for a video monitor to protect against glare. The device includes top, first side and second side panels. The top panel is edge-connected between the first and second side panels. The first side panel is edge-connected along a fold line with a right side edge of the top panel and the second side panel is edge-connected along a fold line with a left side edge of the top panel. The first and second side panels are approximately equal size. Hook and loop strips are connected to the top and side panels for attaching the panels about the video monitor. The device is attached to the monitor by attaching the hook and loop strip of the first side panel about the monitor then the top panel is folded along the fold line with the first side panel and the hook and loop strip of the top panel is attached about the monitor. Next, the hook and loop strip of the second side panel is attached about the monitor by folding the second side panel along the fold line with the top panel, completing the attachment of the device.

17 Claims, 4 Drawing Sheets

COLLAPSIBLE GLARE REDUCTION DEVICE FOR A VIDEO MONITOR

FIELD OF THE INVENTION

This invention relates to glare reduction devices for television and video monitors and in particular to a glare reduction device that is attachable to a video monitor and collapsible to fold down into a compact shape.

BACKGROUND OF THE INVENTION

It is known in the art relating to television and video monitors to provide a glare reduction device to reduce and/or prevent glare on the monitor created by ambient light. Ambient light, especially in an outdoor environment, makes it difficult to see the monitor screen properly. It is necessary to preclude as much of this light as possible from reaching the screen so that viewing of the video screen is improved.

Applicant herein invented a hood for a video screen in U.S. Pat. No. 4,685,420 with a rigid walled structure which has been sold to eliminate glare on a video screen. However, the rigid walled structure is not easily portable and does not lend itself to adaption to video screens in a range of sizes. There is a need for a device that is durable, lightweight, portable and easily attachable to a television or video monitor and adaptable to video screens in a range of sizes.

SUMMARY OF THE INVENTION

The present invention provides a collapsible glare reduction device that is openable to a shape conforming to the dimensions of a television screen or video monitor. The device is easily attachable to the monitor and can be conveniently folded down for transporting and stored away when not in use. When opened it is configurable into a box shape having a mounting end and a viewing end.

The glare reduction device includes top, first side and second side panels. The top panel has front, back, left side and right side edges and the first and second side panels have front and back edges. The mounting end of the hood is attached to the video monitor by securing means such as hook and loop strips. The top panel is edge-connected between the first and second side panels. The first side panel is edge-connected with the top panel along a fold line with the right side edge of the top panel. The second side panel is edge-connected with the top panel along a fold line with the left side edge of the top panel. The first and second side panels are approximately equal size.

The glare reduction device is attachable to the monitor by attaching the securing means about the monitor. The securing means of the first side panel is attached to the monitor then the top panel is folded along the fold line with the first side panel and the securing means of the top panel is attached to the monitor. Next, the securing means of the second side panel is attached to the monitor by folding the second side panel along the fold line with the top panel to complete the attachment of the device.

In one embodiment of the present invention, the securing means are cooperating hook and loop strips, such as are known and sold under the trademark "VELCRO." One strip is attached to the monitor and the other is attached to the glare reduction device.

When the panels are folded about the monitor, they can form a closure which may have an outwardly or inwardly tapered shape. In one arrangement the taper provides a decreasing cross section from the front edges to the back edges of the panels. In another arrangement, the taper provides a decreasing cross section from the back edges to the front edges of the panels.

The glare reduction device may be made from a flexible material. The flexible material may be a fabric material such as nylon, which allows the device to lay flat when not in use. Also, the first and second side panels may include a longitudinally extending fold line extending through approximately the center of the first and second side panels from the front edge to the back edge to allow the glare reduction device to collapse or lay flat when not in use. Each panel may include a transversely extending fold line to allow a portion of the device to be folded back toward the monitor, shortening the viewing distance.

The device may include lengthening panels extending from the top panel, first side panel and second side panel. In this arrangement, the securing means is mounted on the lengthening panels. The glare reduction device enables a viewer to view glare free monitor images in outdoor settings.

The device may further include a bottom panel having front, back, left side and right side edges. Securing means connected to the bottom panel attach the left side edge of the bottom panel to the first side panel. The right side edge of the bottom panel is edge-connected along a fold line with the second side panel. The top and bottom panels are approximately of equal size. The bottom panel is attachable about the monitor by folding the bottom panel along the fold line with the second side panel and attaching the securing means of the bottom panel to the first side panel.

Alternatively, the bottom panel may be completely detachable from the second side panel. This configuration allows the user to view the monitor at a closer range. Hook and loop strips may be used to attach the bottom panel to the second side panel.

These and other features and advantages of the invention will be more fully understood from the following detailed description of the invention taken together with the accompanying drawings.

BRIEF DESCRIPTION OF THE DRAWINGS

In the drawings:

FIG. 4 is a side view of the glare reduction device of FIG. 3 in accordance with the present invention in a partially folded down position;

FIG. 5 is a perspective view of the glare reduction device of FIG. 3 having a portion of the panels folded back to provide a shorter viewing distance.

DETAILED DESCRIPTION OF THE INVENTION

Figure 1:
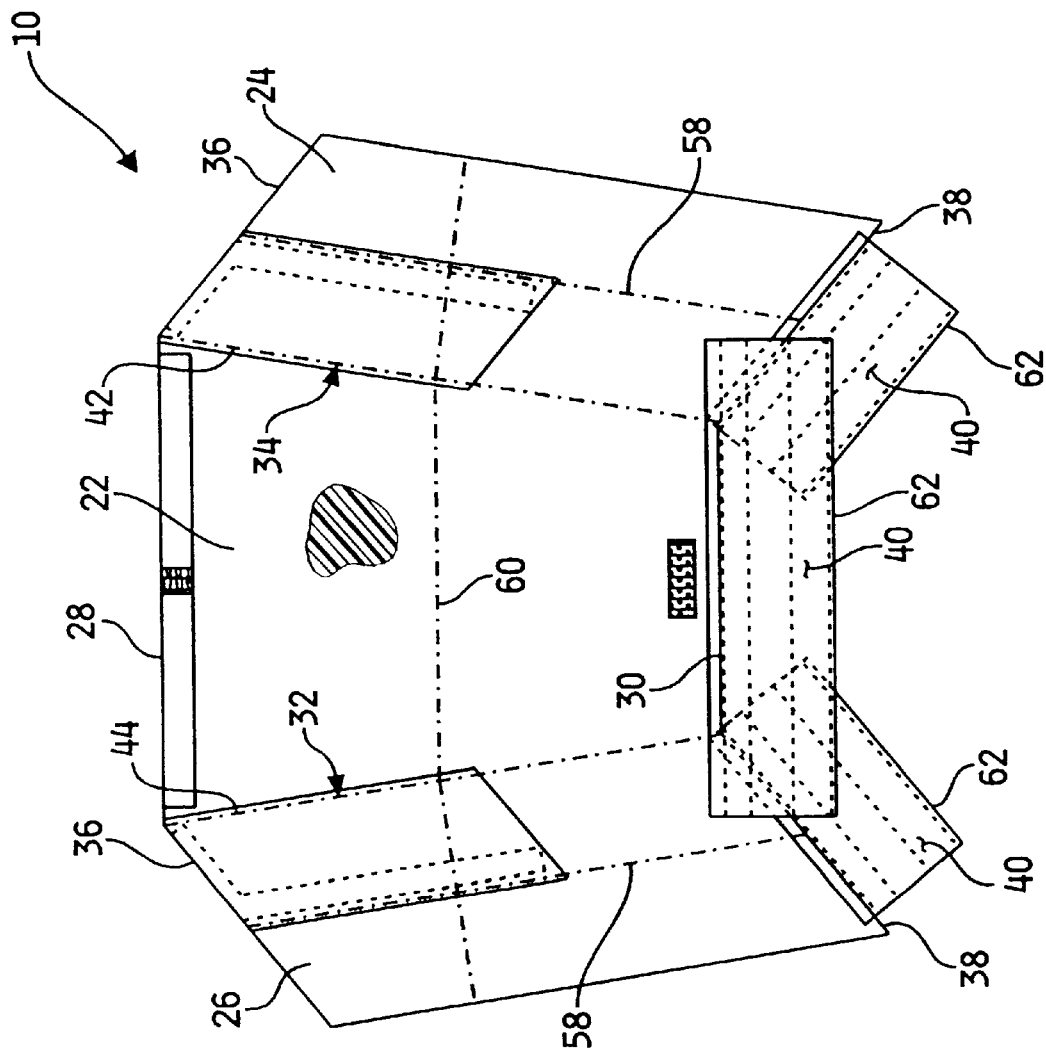
FIG. 1 is a plan view of the inside layout of the glare reaction device in accordance with the present invention.
Figure 2:
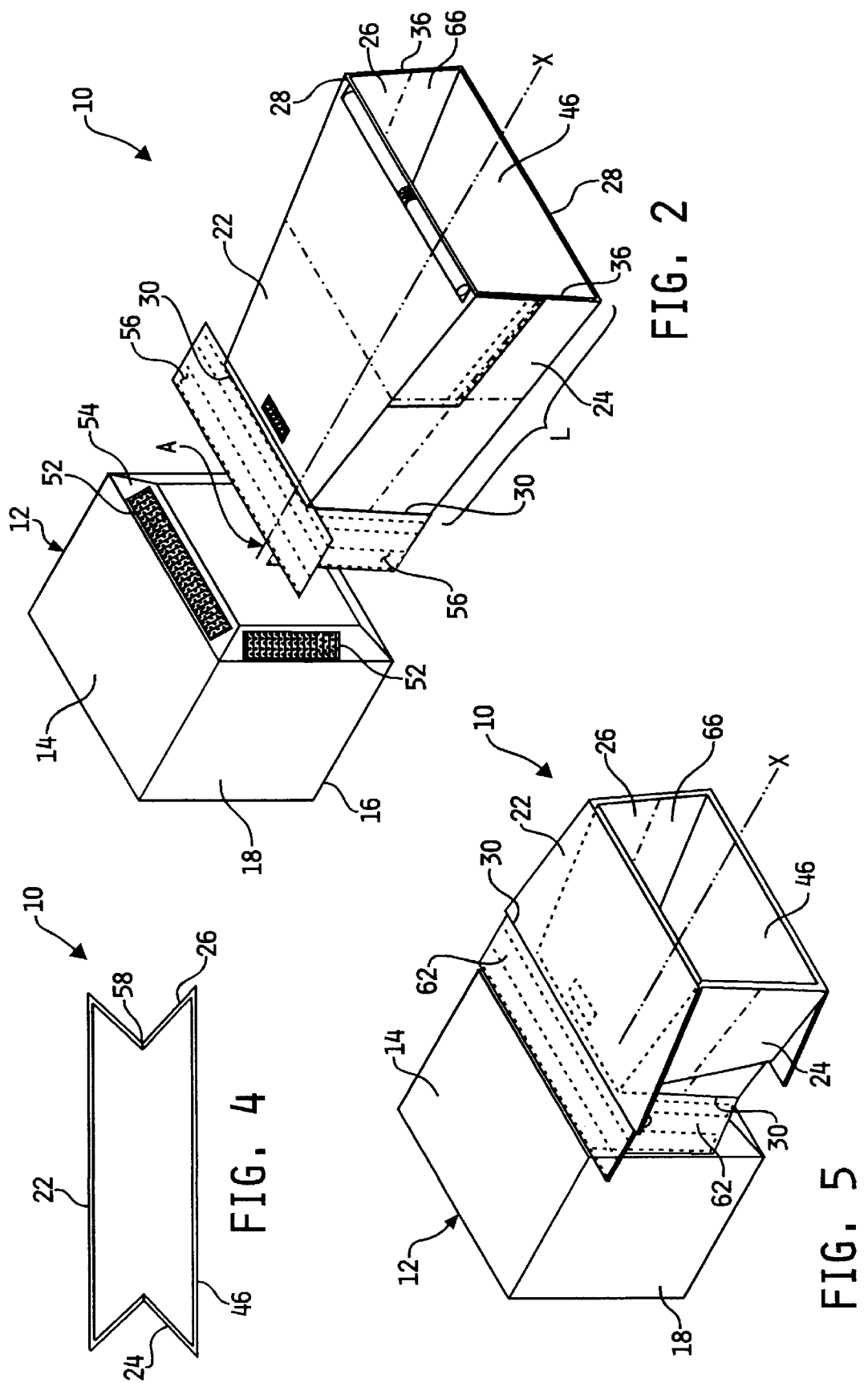
FIG. 2 is a perspective view of the glare reduction device attached to a video monitor.

Referring now to FIGS. 1 and 2 of the drawings in detail, numeral 10 generally indicates a collapsible glare reduction device constructed in accordance with the present invention. The device 10 is attachable to a video monitor 12 or other such device to provide a glare-free viewing of the monitor 12. The video monitor 12 has top, bottom, left and right sides 14, 16, 18, 20. The glare reduction device 10 reduces glare by providing panels that project outwardly from all sides of the monitor 12. The device 10 also provides a temporary glare reduction device that can be conveniently detached from the monitor 12, collapsed and stored for later use.

The glare reduction device 10 includes top, first side and second side panels 22, 24, 26. The top panel 22 has front, back, left and right edges 28, 30, 32, 34. The first and second side panels 24, 26 have front and back edges 36, 38. The device 10 is attached to the video monitor 12 by securing means 40. The top panel 22 is edge-connected between the first and second side panels 24, 26. The first side panel 24 is edge-connected with the top panel 22 along a fold line 42 with the right side edge 34 of the top panel 22. The second side panel 26 is edge-connected with the top panel 22 along a fold line 44 with the left side edge 32 of the top panel 22. The first and second side panels 24, 26 are approximately equal size.

The glare reduction device 10 is attachable to the monitor 12 by attaching the securing means 40 of the panels 22, 24, 26 about the monitor 12 and attaching the panels 22, 24, 26 to the monitor 12 using the securing means 40. The securing means 40 of the first side panel 24 is attached to the left side 18 of the monitor 12. Then the top panel 22 is folded along the fold line 42 with the first side panel 24 and the securing means 40 of the top panel 22 is attached to the top side 14 of the monitor 12. Next, the securing means 40 of the second side panel 26 is attached to the right side 20 of the monitor 12 by folding the second side panel 26 along the fold line 44 with the top panel 22 to complete the attachment of the device 10.

Figure 3:
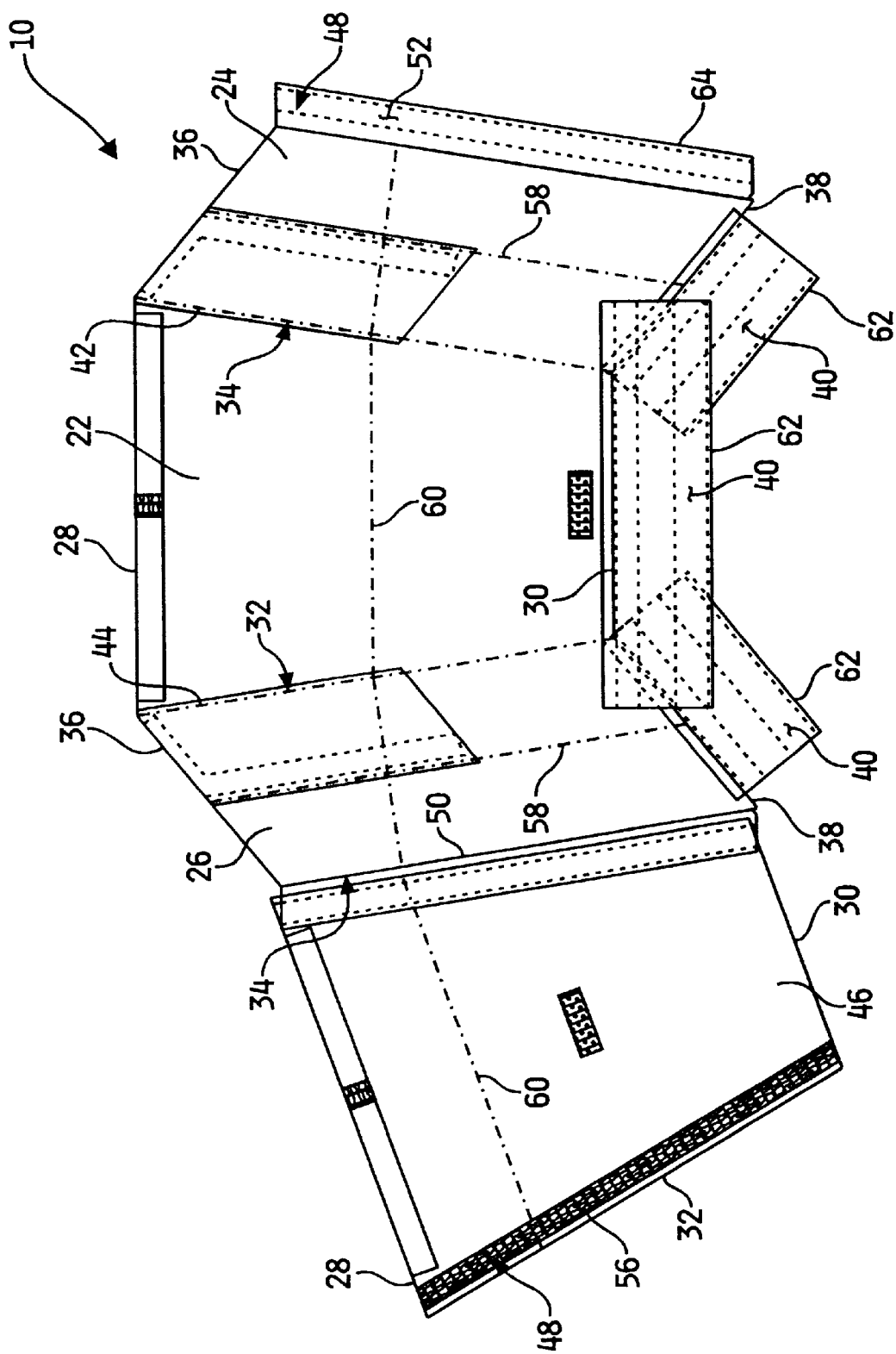
FIG. 3 is a plan view of the inside layout of the glare reduction device in accordance with one embodiment of the present invention.

In one embodiment: of the present invention, the device may further include a bottom panel 46 as illustrated in FIG. 3. The bottom panel 46 has front, back, left side and right side edges 28, 30, 32, 34. Securing means 48 connected to the bottom panel 46 attach the left side edge 32 of the bottom panel 46 to the first side panel 24. The right side edge 34 of the bottom panel 46 is edge-connected along a fold line 50 with the second side panel 26. The top and bottom panels 22, 46 are approximately of equal size. The bottom panel 46 is attachable about the monitor 12 by folding the bottom panel 46 along the fold line 50 with the second side panel 26 and attaching the securing means 48 of the bottom panel 46 to the first side panel 24.

Preferably, the securing means 40 are cooperating hook and loop strips, such as are known and sold under the trademark "VELCRO." Each strip includes a hook strip portion 52 which is attachable to a bezel edge 54 of the monitor 12 and a loop strip portion 56 that is attached to the device 10. The hook strip portion 52 has a removable backing, which protects the adhering surface until the time of use and mounting of the glare reduction device 10. Alternatively, the loop strip portion 56 may be attached to the monitor 12 and the hook strip portion 52 may be attached to the device 10. Hook and loop strips 52, 56 may also be used to attach the bottom panel 46 to the first side panel 24 to complete the attachment of the device 10 about the monitor 12.

While the use of VELCRO® is the preferred technique for attaching the glare reduction device 10 to the monitor 12, the device 10 may be attached to the monitor 12 in other ways. For example, a suitable adhesive may be used to attach device 10 to the monitor 12, either directly or through the use of double-sided adhesive tape. Alternatively, monitor 12 and device 10 may be cooperatively designed so that the device 10 mechanically mates with the monitor 12 in a snapping action or otherwise.

The glare reduction device 10 may form a closure having an outwardly or inwardly tapered shape. In one arrangement the taper provides a decreasing cross section from the front edges 28, 36 to the back edges 30, 38 of the panels 22, 24, 26, 48. In another arrangement, the taper provides a decreasing cross section area from the back edges 30, 38 to the front edges 28, 36 of the panels 22, 24, 26, 48.

The glare reduction device 10 has a length L between the back edges 30, 38 and the front edges 28, 36 of the panels 22, 24, 26, 48 to obstruct light rays entering the device 10 at the viewing end from striking the video monitor 12 perpendicularly. Furthermore, the device 10 has a central viewing axis X that extends at an angle to the plane on the video monitor 12. The device 10, shown as being angled up, can also be angled down as a matter of convenience to provide glare elimination.

The glare reduction device 10 may be made from a flexible durable material. The flexible material may be a fabric material such as nylon, allowing the device 10 to lay flat when not in use. Also, the first and second side panels 24, 26 each include a longitudinally extending fold line 58 extending through approximately the center of the first and second side panels 24, 26 from the front edge 28 to the back edge 38 of the first and second side panels 24, 26 to allow the device 10 to lay flat as shown in FIG. 4. The panels 22, 24, 26, 48 may be reinforced or made rigid by using a stiffener under the nylon material. The stiffener may be made from a plastic or other suitable material.

Each panel 22, 24, 26, 48 may include a transversely extending fold line 60. The fold line 60 allows a portion of the device 10 to be folded back toward the monitor 12, shortening the viewing distance as shown in FIG. 5.

The glare reduction device 10 illustrated includes optional lengthening panels 62 extending from the back edges 30, 38 of the top panel 22, first side panel 24 and second side panel 26. The lengthening panels 62 are used to attach the device 10 to the monitor 12 and the panels to each other. A lengthening panel 64 may be used to attach the bottom panel 48 to the second side panel 26.

The glare reduction device 10 preferably has an inside surface 66 of a light absorbing color to reduce the reflection of light within the device 10. In the preferred construction, the inside surface is black.

Figure 6:
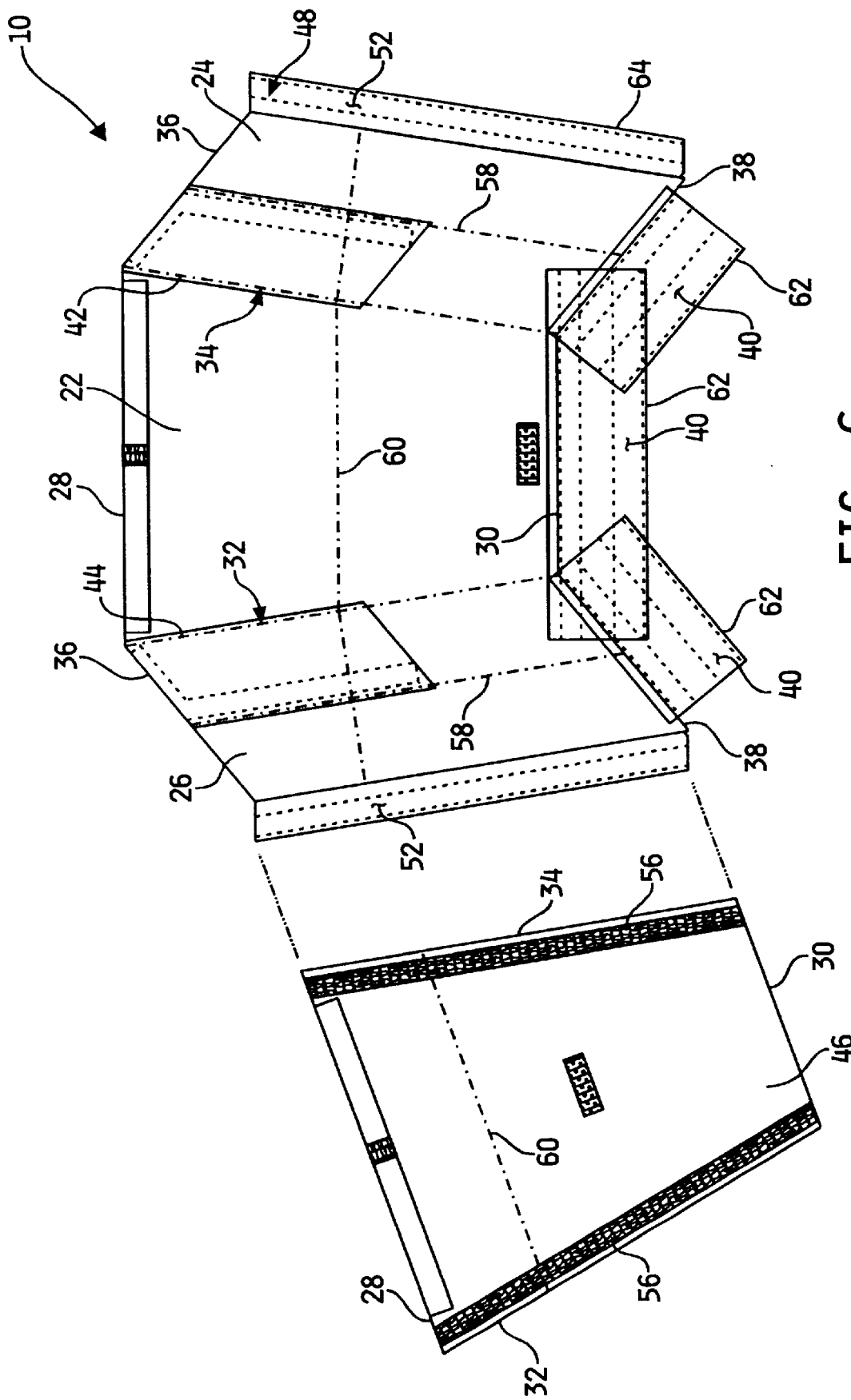
FIG. 6 is a plan view of the inside layout of the glare reduction device in accordance with another embodiment of the present invention.

In another embodiment of the present invention, the bottom panel 48 may be completely detachable from the second side panel 26 as shown in FIG. 6. This configuration allows the user to view the video monitor 12 at a closer range. Hook and loop strips 52, 56 may be used to attach the bottom panel 48 to the second side panel 26.

Glare reduction device 10 enables a viewer to view glare free monitor images in outdoor settings. The configuration of the glare reduction device 10 allows the device 10 to be conveniently folded when in use and collapsed when not in use.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A collapsible glare reduction device for a video monitor comprising:

a top panel having front, back, left side and right side edges;

first and second side panels, each having front and back edges and a longitudinally extending fold line extending through approximately the center of the first and second side panels from the front edge to the back edge of first and second side panels;

said top, first side and second side panels being openable to define an enclosed passage extending between the front and back edges; and securing means connected to said top and side panels for attaching said back edges of said panels about the video monitor;

said top panel being edge-connected between the first and second side panels wherein said first side panel is edge-connected along a fold line with the right side edge of said top panel and said second side panel is edge-connected along a fold line with the left side edge of the top panel;

said first and second side panels being approximately equal in size;

said device being attachable to the video monitor by attaching the securing means of said first side panel about the monitor, folding the top panel along the fold line with the first side panel and attaching the securing means of said top panel about the monitor, folding the second side panel along the fold line with the top panel and attaching the securing means of said second side panel about the monitor.

2. The collapsible glare reduction device of claim 1 wherein the panels form a tapered shape, said taper provides for decreasing cross section from the front edges to the back edges.

3. The collapsible glare reduction device of claim 1 wherein the panels are made from a flexible material.

4. The collapsible glare reduction device of claim 3 wherein the panels include a stiffener under the flexible material.

5. The collapsible glare reduction device of claim 4 wherein the stiffener is made from a plastic material.

6. The collapsible glare reduction device of claim 1 wherein each panel includes a transversely extending fold line to allow a portion of said panels to be folded back toward the video monitor.

7. The collapsible glare reduction device of claim 1 including lengthening panels extending from said top, first side and second side panels and said securing means is mounted on said lengthening panels.

8. A collapsible glare reduction device for a video monitor comprising:

a top panel having front, back, left side and right side edges;

first and second side panels, each having front and back edges;

said top, first side and second side panels being openable to define an enclosed passage extending between the front and back edges; and securing means connected to said top and side panels for attaching said back edges of said panels about the video monitor, said top panel being edge-connected between the first and second side panels wherein said first side panel is edge-connected along a fold line with the right side edge of said top panel and said second side panel is edge-connected along a fold line with the left side edge of the top panel;

said first and second side panels being approximately equal in size;

said device being attachable to the video monitor by attaching the securing means of said first side panel about the monitor, folding the top panel along the fold line with the first side panel and attaching the securing means of said top panel about the monitor, folding the second side panel along the fold line with the top panel and attaching the securing means of said second side panel about the monitor;

a bottom panel having front, back, left side and right side edges;

securing means connected to said bottom panel for attaching said left side edge of said bottom panel to the first side panel;

said second side panel being edge-connected along a fold line with the right side edge of the bottom panel;

said top and bottom panels being approximately equal size; and said bottom panel being attachable about the monitor by folding said bottom panel along the fold line with the second side panel and attaching said securing means of said bottom panel to the first side panel.

9. The collapsible glare reduction device of claim 8 wherein the bottom panel is detachable from the second side panel.

10. The collapsible glare reduction device of claim 8 wherein each panel includes a transversely extending fold line to allow a portion of said panels to be folded back toward the video monitor.

11. The collapsible glare reduction device of claim 8 wherein the first and second side panels each include a longitudinally extending fold line extending through approximately the center of the first and second side panels from the front edge to the back edge of first and second side panels.

12. The collapsible glare reduction device of claim 8 wherein the panels form a tapered shape, said taper provides for decreasing cross section from the front edges to the back edges.

13. The collapsible glare reduction device of claim 8 wherein the panels form a tapered shape, said taper provides for decreasing cross section from the back edges to the front edges.

14. The collapsible glare reduction device of claim 8 wherein the panels are made from a flexible material.

15. The collapsible glare reduction device of claim 14, wherein the panels include a stiffener under the flexible material.

16. The collapsible glare reduction device of claim 15 wherein the stiffener is made from a plastic material.

17. A collapsible glare reduction device for a video monitor comprising:

top and bottom panels, each having front, back, left side, and right side edges;

first and second side panels, each having front and back edges;

said top, bottom, first side and second side panels define an enclosed passage extending between the front and back edges; and securing means connected to said top and side panels for attaching said back edges of said panels about the video monitor;

securing means connected to said bottom panel for attaching a side of said bottom panel to a side panel;

said top panel being edge-connected between the first and second side panels wherein said first side panel is edge-connected along a fold line with the right side edge of said top panel and said second side panel is edge-connected along a fold line with the left side edge of the top panel, said second side panel being edge-connected along a fold line with the right side edge of the bottom panel, said top and bottom panels being approximately equal in size, said first and second side panels being approximately equal in size, said device being attachable to the video monitor by attaching the securing means of said first side panel about the monitor, folding the top panel along the fold line with the first side panel and attaching the securing means of said top panel about the monitor, folding the second side panel along the fold line with the top panel and attaching the securing means of said second side panel about the monitor, folding the bottom panel along the fold line with the second side panel and attaching the securing means of said bottom panel to the first side panel.

\* \* \* \* \*